(12) United States Patent
Nagano et al.

(10) Patent No.: US 10,237,903 B2
(45) Date of Patent: Mar. 19, 2019

(54) REMOTE MAINTENANCE SYSTEM

(71) Applicants: KABUSHIKI KAISHA TOSHIBA, Minato-ku (JP); TOSHIBA SOLUTIONS CORPORATION, Kawasaki-shi (JP)

(72) Inventors: Kazutoshi Nagano, Yokohama (JP); Masaki Kishihara, Higashikurume (JP); Takayasu Kamo, Kawasaki (JP); Kyousuke Funami, Komae (JP); Satoko Akizuki, Suginami (JP); Kenta Furusawa, Fuchu (JP); Nobuhiro Sekiya, Kawasaki (JP)

(73) Assignees: KABUSHIKI KAISHA TOSHIBA, Minato-ku (JP); TOSHIBA SOLUTIONS CORPORATION, Kawasaki-shi (JP)

(*) Notice: Subject to any disclaimer, the term of this patent is extended or adjusted under 35 U.S.C. 154(b) by 158 days.

(21) Appl. No.: 15/320,009

(22) PCT Filed: Jun. 23, 2015

(86) PCT No.: PCT/JP2015/003144
§ 371 (c)(1),
(2) Date: Dec. 19, 2016

(87) PCT Pub. No.: WO2016/207927
PCT Pub. Date: Dec. 29, 2016

(65) Prior Publication Data
US 2017/0188399 A1 Jun. 29, 2017

(51) Int. Cl.
*H04W 76/12* (2018.01)
*H04W 76/30* (2018.01)
*G06F 11/30* (2006.01)
*H04L 29/12* (2006.01)
*H04W 4/12* (2009.01)
*H04W 40/24* (2009.01)
*H04W 88/04* (2009.01)

(52) U.S. Cl.
CPC ............ *H04W 76/12* (2018.02); *G06F 11/30* (2013.01); *H04L 61/2015* (2013.01);
(Continued)

(58) Field of Classification Search
None
See application file for complete search history.

(56) References Cited

U.S. PATENT DOCUMENTS 7,512,116 B2 * 3/2009 Ohura ............... H04L 29/06027
370/352
9,948,548 B2 * 4/2018 Gandhi ................... H04L 45/28
(Continued)

FOREIGN PATENT DOCUMENTS

| JP | 2001-266272 A | 9/2001 |
|---|---|---|
| JP | 2006-86974 | 3/2006 |

(Continued)

OTHER PUBLICATIONS

International Search Report dated Sep. 15, 2015 in PCT/JP2015/003144 filed Jun. 23, 2015.

*Primary Examiner* — Lonnie V Sweet
(74) *Attorney, Agent, or Firm* — Oblon, McClelland, Maier & Neustadt, L.L.P.

(57) ABSTRACT

A remote maintenance system includes a maintenance management apparatus connected to a user apparatus and a communication relay apparatus connected to a remote-controlled apparatus. The maintenance management apparatus transmits, to the communication relay apparatus, message data whose destination is unique identification information of a mobile communication network assigned in advance to the communication relay apparatus. The communication relay apparatus notifies the maintenance management apparatus of an IP address that is dynamically assigned to itself upon reception of the message data. The maintenance management apparatus transmits, to the com- (Continued)

munication relay apparatus, information on remote operation received from the user apparatus whose destination is the notified IP address. The communication relay apparatus relays, to the remote-controlled apparatus, the information on the remote control received from the maintenance management apparatus.

9 Claims, 8 Drawing Sheets

(52) U.S. Cl.
CPC ........ *H04L 61/2076* (2013.01); *H04L 61/256* (2013.01); *H04W 4/12* (2013.01); *H04W 40/248* (2013.01); *H04W 76/30* (2018.02); *H04L 61/2514* (2013.01); *H04W 88/04* (2013.01)

(56) References Cited

U.S. PATENT DOCUMENTS

| | | | | |
|---|---|---|---|---|
| 2008/0317010 A1* | 12/2008 | Naqvi | ................ | H04L 65/1016 370/355 |
| 2009/0061869 A1* | 3/2009 | Bui | ................... | H04L 29/12283 455/435.1 |
| 2010/0033573 A1 | 2/2010 | Malinovski et al. | | |
| 2012/0151059 A1 | 6/2012 | Tanimoto et al. | | |
| 2012/0307630 A1* | 12/2012 | Markwart | ................ | H04L 41/08 370/228 |
| 2014/0036873 A1* | 2/2014 | Cheng | ................ | H04W 36/0022 370/331 |
| 2014/0222942 A1 | 8/2014 | Lin et al. | | |
| 2015/0006689 A1* | 1/2015 | Szilagyi | .............. | H04L 41/0886 709/222 |
| 2016/0182683 A1* | 6/2016 | Wear | .................... | H04L 61/2514 709/203 |
| 2016/0269489 A1* | 9/2016 | Douet | ................. | H04L 12/2854 |
| 2016/0337859 A1* | 11/2016 | Pantus | ................... | H04W 12/08 |

FOREIGN PATENT DOCUMENTS

| | | |
|---|---|---|
| JP | 2006-285948 | 10/2006 |
| JP | 2009-157597 A | 7/2009 |
| JP | 2010-9204 A | 1/2010 |
| JP | 2010-518764 A | 5/2010 |
| JP | 2011-44861 | 3/2011 |
| JP | 2012-155712 A | 8/2012 |
| JP | 2014-154149 A | 8/2014 |

\* cited by examiner

REMOTE MAINTENANCE SYSTEM

TECHNICAL FIELD

An embodiment of the present invention relates to a network connection technique for remotely controlling a apparatus (device) in a remote location via the network.

BACKGROUND ART

For example, there is a known remote maintenance technique for diagnosing and understanding the operational status of an apparatus in a remote location and for collecting data, such as an operational history, from the apparatus. A user apparatus that performs a remote operation is connected to the apparatus in the remote location via the network, such as the Internet. A remote command input by the user apparatus is transmitted via the network to the apparatus in the remote location. The apparatus executes a predetermined maintenance process according to the received remote command and transmits the maintenance process results to the user apparatus.

PRIOR ART DOCUMENT

Patent Document

[Patent Document 1] Japanese Patent Laid-Open No. 2009-157597
[Patent Document 2] Japanese Patent Laid-Open No. 2010-9204

DISCLOSURE OF THE INVENTION

Problems to be Solved by the Invention

There is provided a remote maintenance system that performs active network connection from a remote location where a remote-controlled apparatus is provided and executes relay for connection and data communication between the user apparatus and the remote-controlled apparatus.

Means for Solving the Problems

A remote maintenance system according to an embodiment is a maintenance service system configured to perform network connection for remotely controlling a remote-controlled apparatus from the user apparatus. The maintenance service system comprising: a maintenance management apparatus configured to connect to the user apparatus; and a communication relay apparatus that is a network node in the maintenance management apparatus and configured to connect to the remote-controlled apparatus. The communication relay apparatus configured to be assigned unique identification information of a mobile communication network in advance and an IP address dynamically assigned by a predetermined DHCP for identifying the communication relay apparatus as the network node. the maintenance management apparatus includes: a mobile communication unit configured to transmit message data including the unique identification information of the communication relay apparatus as a destination, to the communication relay apparatus via the mobile communication network; and an IP communication unit configured to receive the IP address from the communication relay apparatus and to relay to the communication relay apparatus the remote control information received from the user apparatus, based on the received IP address. the communication relay apparatus includes: a message reception unit configured to receive the message data via the mobile communication network; and a communication control unit configured to connect to the maintenance management apparatus relative to a reception of the message data and to notify the IP address dynamically assigned to the communication relay apparatus, and to receive the remote control information including the IP address as a destination from the maintenance management apparatus and to relay the remote control information to the remote-controlled apparatus.

MODE FOR CARRYING OUT THE INVENTION

A preferred embodiment of the present invention will hereinafter be described with reference to the accompanying drawings.
(First Embodiment)
FIGS. 1 to 7 are network configuration diagrams of a remote maintenance system according to a first embodiment. The remote maintenance system according to this embodiment includes a maintenance management apparatus 100 connected to a user apparatus 300 and a communication relay apparatus 200 connected to a remote-controlled apparatus(s) 400 disposed in a remote location (field).

Figure 1:
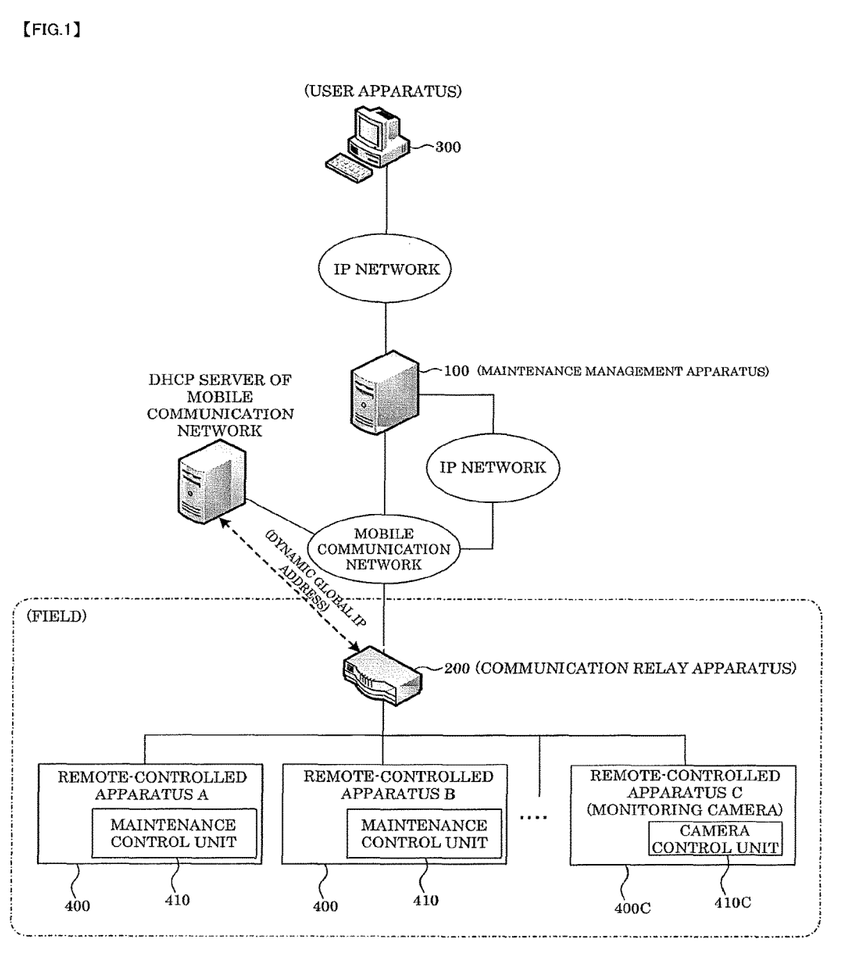
FIG. 1 is a network configuration diagram of a remote maintenance system according to a first embodiment.

The user apparatus 300 is a computer apparatus including a remote client that performs SSH communication and a remote operation for the remote-controlled apparatus 400. The remote client is, for example, an SSH client (Tera Term, etc.). The user apparatus 300 can be connected to the maintenance management apparatus 100 via the IP (Internet Protocol) network.

The remote-controlled apparatus 400 is a monitored apparatus or a monitoring apparatus that monitors the monitored apparatus. Managed apparatuses include, for example, a plant control apparatus and a management server of a predetermined system. Monitoring apparatuses include a monitoring camera.

The remote-controlled apparatus 400 receives a remote command input from the user apparatus 300 and performs a process according to the remote command. For example, the remote-controlled apparatus 400 may include a maintenance control unit 410. the maintenance control unit 410 performs a maintenance process such as a diagnosis process for diagnosing the operational status of the remote-controlled apparatus 400 based on the remote command and outputs the diagnosis results, and such as collecting and outputting log information such as an operational history.

As illustrated in FIG. 1, a remote-controlled apparatus 400C configured as a monitoring camera includes a camera control unit 410C. The remote-controlled apparatus 400C can perform an operation for capturing a moving or still image in response to the remote command, output the captured image, and change the capturing orientation using a pan tilting mechanism.

The communication relay apparatus 200 is a network node which is connected to the remote-controlled apparatus 400 and disposed in a remote location (field). The communication relay apparatus 200 is a gateway that is connected to one or a plurality of the remote-controlled apparatuses 400 in an identical segment and located between the remote-controlled apparatus 400 and the maintenance management apparatus 100. The communication relay apparatus 200 is connected to the remote-controlled apparatus 400 via a wireless LAN/wired LAN, and the communication relay apparatus 200 and the remote-controlled apparatus 400 are connected over TCP/IP.

The communication relay apparatus 200 is connected to a mobile communication network (for example, a 3G network, such as W-CDMA; or a cellular phone network of GSM (carrier network)). The mobile communication network can be mutually connected with the IP network. The communication relay apparatus 200 can be wirelessly connected to the IP network via the mobile communication network. Specifically, the communication relay apparatus 200 according to this embodiment is connectable only to the mobile communication network and cannot be connected to the IP network without being routed through the mobile communication network.

As in the case of a cellular phone, the communication relay apparatus 200 includes a storage medium (SIM (Subscriber Identity Module Card) card) which stores a unique ID number (IMSI (International Mobile Subscriber Identity)) for identifying a subscriber of the mobile communication network. A phone number is associated with the unique ID number. The maintenance management apparatus 100 can transmit a message via a mobile communication network whose destination is the phone number and/or unique ID number of the communication relay apparatus 200 (hereinafter referred to as "SIM information").

The mobile communication network may use SMS (Short Message Service). SMS is a system for transmitting a message via the mobile communication network. In this embodiment, the maintenance management apparatus 100 can specify the destination by the SIM information of the communication relay apparatus 200 and transmit a message to the communication relay apparatus 200 via the mobile communication network. A message can contain character information in a text format.

As described above, the communication relay apparatus 200 can be connected to the IP network via the mobile communication network. When this connection is made, a global IP address is dynamically assigned by the DHCP server of the mobile communication network to the communication relay apparatus 200. The communication relay apparatus 200 can use the dynamically assigned global IP address to perform data communication with the maintenance management apparatus 100.

Specifically, when the maintenance management apparatus 100 transmits a TCP/IP packet destined for the global IP address assigned to the communication relay apparatus 200 to the IP network, a predetermined gateway server (not shown) that performs mutual connection between the IP network and the mobile communication network relays. The gateway server transmits a packet corresponding to the TCP/IP packet to the appropriate global IP address in the mobile communication network.

In the foregoing manner, the communication relay apparatus 200 needs to be connectable to the mobile communication network only and is not required to have a direct connection with the IP network. The communication relay apparatus 200 can use the dynamically assigned global IP address to connect to the IP network via the mobile communication network and perform data communication with the maintenance management apparatus 100. As well, the communication relay apparatus 200 can use only the mobile communication network to specify the SIM information and perform message data communication.

Figure 2:
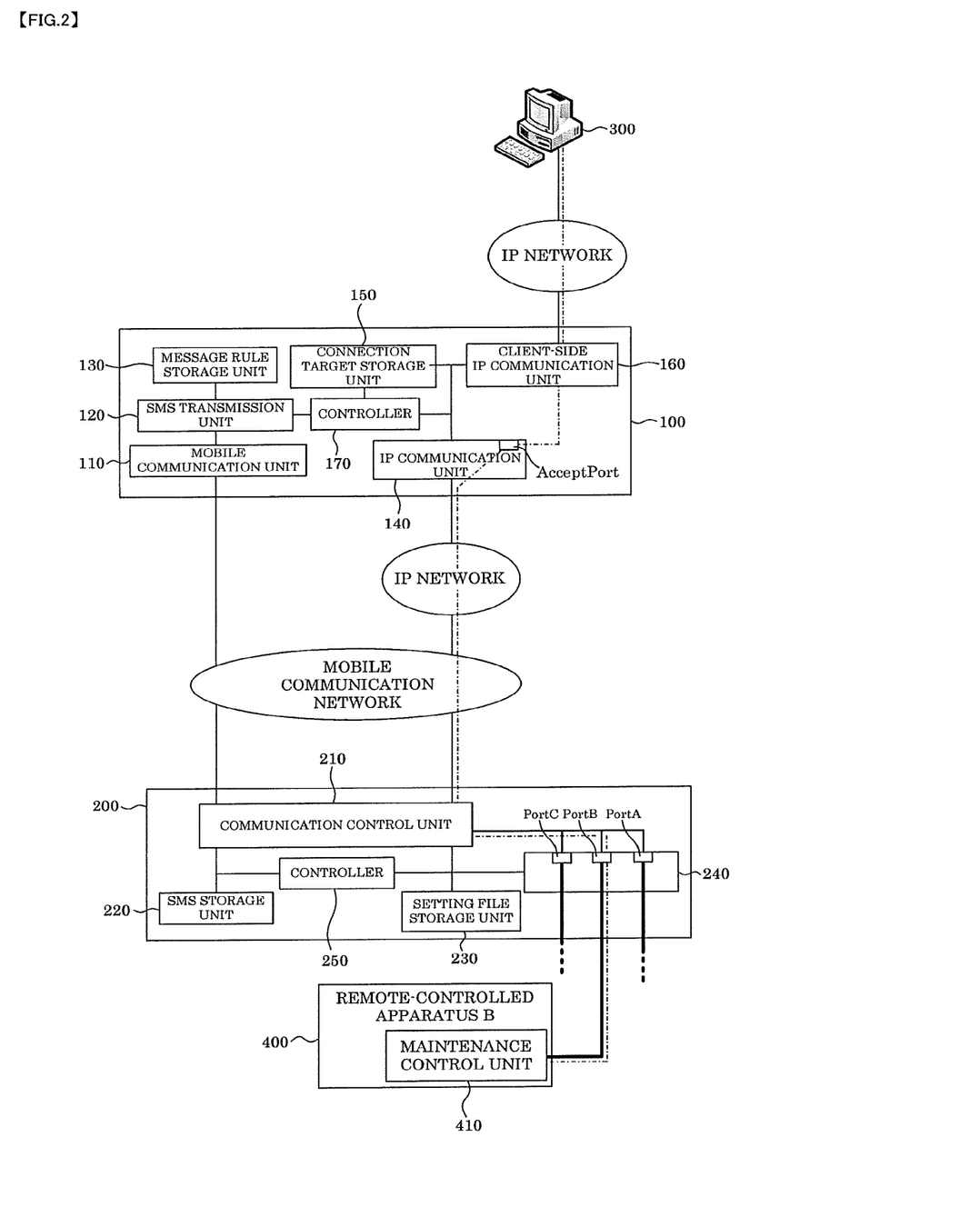
FIG. 2 is a configuration block diagram of the remote maintenance system according to the first embodiment.

FIG. 2 is a configuration block diagram of the remote maintenance system according to this embodiment.

the maintenance management apparatus 100 includes a mobile communication unit 110, an SMS transmission unit 120, and a message rule storage unit 130, as a mobile communication function. The message rule storage unit 130 stores predetermined text information (trigger information) for the communication relay apparatus 200 to actively start connection to the maintenance management apparatus 100 via the IP network.

In response to a connection request from the user apparatus 300, the SMS transmission unit 120 extracts the trigger information stored in the message rule storage unit 130 and generates message data whose destination is the SIM information of the communication relay apparatus 200. The mobile communication unit 110 performs communication control whereby the designated SIM information is used as a destination to send out the generated message data via the mobile communication network.

The SIM information of the communication relay apparatus 200 is stored in advance in a below-described connection target storage unit 150. The SMS transmission unit 120 extracts the connection target contained in the connection request of the user apparatus 300, specifically, the phone number (or the unique ID number) of the communication relay apparatus 200 associated with the remote-controlled apparatus that the user wishes to remotely operate from the connection target storage unit 150, and generates message data.

The maintenance management apparatus 100 includes an IP communication unit 140, the connection target storage unit 150, and a client-side communication unit 160 as an IP network communication function. The IP communication unit 140 controls TCP/IP connection and data communication with the communication relay apparatus 200 via the IP network. As in the case of the IP communication unit 140, the IP communication unit 160 of the client-side controls communication with the user apparatus 300 via the IP network.

The connection target storage unit 150 stores the SIM information of one or each of a plurality of the communication relay apparatus 200 connected to the maintenance management apparatus 100. The connection target storage unit 150 stores information (for example, apparatus name, apparatus ID, etc.) on the remote-controlled apparatus 400 connected to the communication relay apparatus 200. The connection target storage unit 150 stores a connection port for connecting to the remote-controlled apparatus 400 over TCP/IP, for each remote-controlled apparatus 400. A controller 170 is a control apparatus that controls the entire maintenance management apparatus 100, and controls each unit thereof.

The communication relay apparatus 200 includes a communication control unit 210, an SMS storage unit 220, a setting file storage unit 230, and a remote control App unit 240. A controller 250 is a control apparatus that controls the entire communication relay apparatus 200, and controls each unit thereof.

As described above, the communication relay apparatus 200 has a SIM card. The communication control unit 210 transmits and receives message data via the mobile communication network according to its own SIM information. The communication control unit 210 functions as a message data reception unit to stores the message data received via the mobile communication network in the SMS storage unit 220.

Also, the communication control unit 210 controls data communication with the maintenance management apparatus 100 using a dynamically assigned global IP address. The setting file storage unit 230 stores the IP address of the maintenance management apparatus 100, a dynamically assigned global IP address that is dynamically assigned at the time of connection to the IP network via the mobile communication network, and the port number of each remote-controlled apparatus 400.

The remote control App unit 240 includes a plurality of communication ports for each of the remote-controlled apparatuses 400, and one remote-controlled apparatus 400 is assigned to each communication port on a one-by-one basis. The remote control App unit 240 is an agent module that accepts connection from the user apparatus 300 via the maintenance management apparatus 100 over SSH to login the remote-controlled apparatus 400. The agent module is, for example, SSHD (SSH daemon).

The remote-controlled apparatus 400 is connected to a designated port of the remote control App unit 240, and the communication control unit 210 connects between the designated port of the remote control App unit 240 and the remote-controlled apparatus 400 over TCP/IP. As described below, the user apparatus 300 and the remote-controlled apparatus 400 need to connect over TCP/IP. The maintenance management apparatus 100 cannot directly connect to the communication relay apparatus 200 via the IP network.

A remote command input from the user apparatus 300 is transmitted over TCP/IP from the maintenance management apparatus 100 to the IP network and is transferred to the communication control unit 210 via the mobile communication network. The maintenance management apparatus 100 and the communication relay apparatus 200 cannot be connected over TCP/IP since the aforementioned two apparatuses are not directly connected by the IP network. Accordingly, the communication control unit 210 relays connection over TCP/IP with the remote control App unit 240 (remote-controlled apparatus 400) and outputs the remote command over TCP/IP to the remote control App unit 240 (remote-controlled apparatus 400).

Conversely, the communication control unit 210 receives over TCP/IP a signal or data output from the remote-controlled apparatus 400, and the communication control unit 210 uses a dynamically assigned global IP address, from the mobile communication network via the IP network, to transmit the signal or data that is output from the remote-controlled apparatus 400 to the maintenance management apparatus 100.

The remote control App unit 240 is provided with a plurality of communication ports corresponding to a plurality of the remote-controlled apparatuses 400. However, this is not the only possible configuration. For example, it is possible to provide a plurality of the remote control App units 240 with a communication port designated to each of a plurality of the remote-controlled apparatuses 400. In this configuration, the communication control unit 210 can perform connection over TCP/IP for each of the communication ports of the remote control App units 240.

The user apparatus 300 is a client that performs a remote operation, and the remote-controlled apparatus 400 is a remote machine. Communication between the user apparatus 300 configured to be a client that performs a remote operation and the remote-controlled apparatus 400 configured to be a remote machine can be safely ensured by TCP/IP connection using, for example, an SSH (Secure Shell) tunnel. A command can be safety executed by means of encryption using the SSH protocol.

The SSH communication which is TCP/IP connection, connects to the remote machine from the client and login to a remote machine. In remote connection via the network, active connection from the client to the remote machine is not eventually possible.

Specifically, when connecting the user apparatus 300 and the remote-controlled apparatus 400 in a remote location via a mobile communication network and/or an IP network, the global IP address of the communication relay apparatus 200 (remote-controlled apparatus 400) is required.

Use of a fixed global IP address enables connection from the maintenance management apparatus 100 to the communication relay apparatus 200. However, the dedicated global IP address for the communication relay apparatus 200 needs, a communication cost increases. When a dynamically assigned global IP address is used, the communication cost is lower and the security is higher than when using a fixed global IP address. However, when the global IP address dynamically changes, the maintenance management apparatus 100 cannot identify the communication relay apparatus 200.

In a communication environment using a low-communication-cost dynamic global IP address, the global IP address of the communication relay apparatus 200 (remote-controlled apparatus 400) cannot be identified. Thus, connection from the maintenance management apparatus 100 (user apparatus 300) to the communication relay apparatus 200 is not possible.

The remote maintenance system according to this embodiment uses SMS via the mobile communication network in order to perform active connection to the IP network via the mobile communication network from the remote location where located the remote-controlled apparatus 400 (the communication relay apparatus 200 to which a dynamic global IP address is assigned), and relays for data communication and connection for SSH communication between the client and the remote machine.

Figure 3:
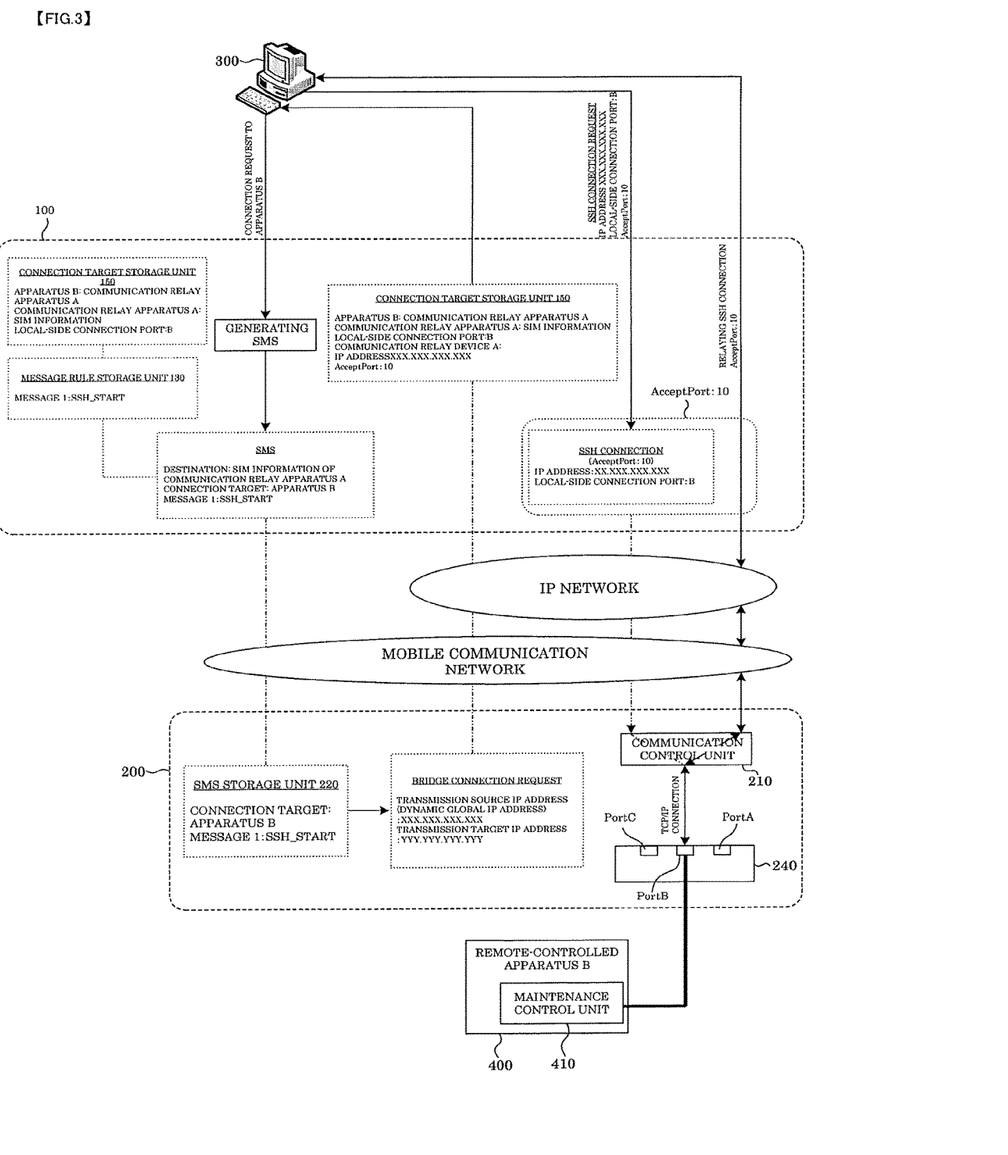
FIG. 3 is a diagram for explaining a connection method of connecting between a user apparatus and a remote-controlled apparatus according to the first embodiment.
Figure 4:
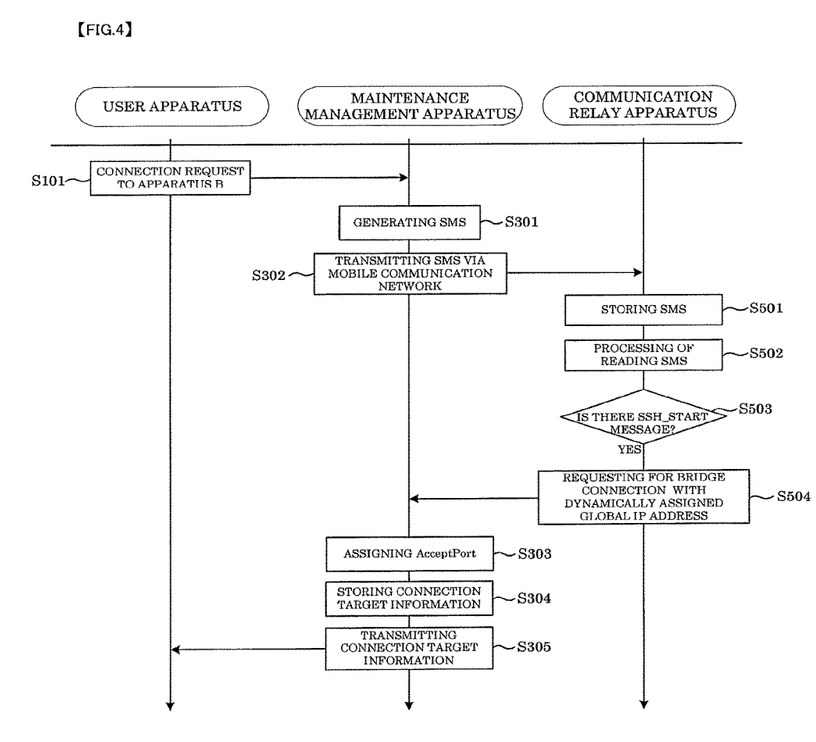
FIG. 4 is a diagram illustrating a flowchart of a connection process of connecting between the user apparatus and the remote-controlled apparatus according to the first embodiment.
Figure 5:
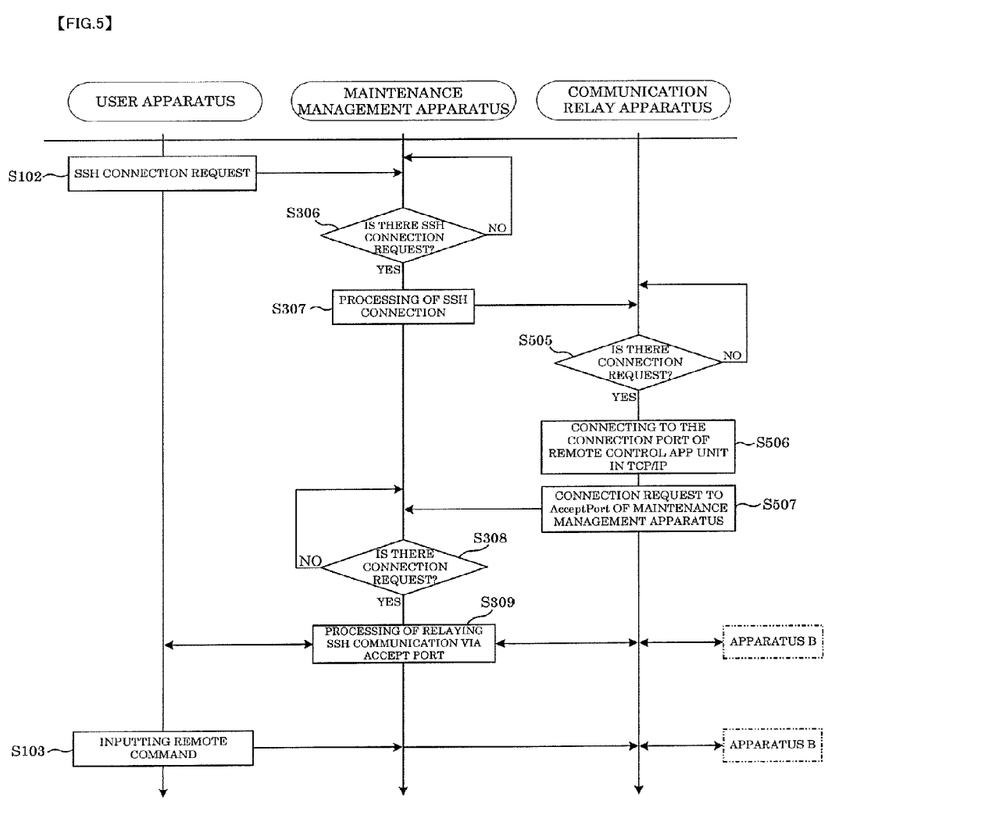
FIG. 5 is a diagram subsequent to the diagram of FIG. 4 illustrating a flowchart of a connection process of connecting between the user apparatus and the remote-controlled apparatus according to the first embodiment.

With reference to FIGS. 3 to 5, a process flow of the remote maintenance system according to the present invention will be explained. FIG. 3 is a diagram explaining a connection method of connecting between the user apparatus 300 and the remote-controlled apparatus 400. FIG. 4 is a diagram illustrating a flowchart for a connection process of connecting between the user apparatus 300 and the remote-controlled apparatus 400. FIG. 5 is a diagram illustrating a flowchart for a connection process subsequent to FIG. 4.

As illustrated in FIG. 4, for example, a user who wishes to remotely operate a remote-controlled apparatus B (hereinafter referred to as "apparatus B") sends a connection request for the apparatus B to the maintenance management apparatus 100, from the user apparatus 300 (S101). The SMS transmission unit 120 refers to the connection target storage unit 150 based on the connection request for the apparatus B and identifies a communication relay apparatus 200 (B) which is a network node of the apparatus B, and extracts SIM information of the identified communication relay apparatus 200.

The SMS transmission unit 120 generates message data in which the "SSH_START" message stored in the message rule storage unit 130 and SIM information of the communication relay apparatus 200 designated as the destination are specified (S301). The mobile communication unit 110 transmits the generated message data byway of the mobile communication network to the communication relay apparatus 200 (S302).

The communication control unit 210 of the communication relay apparatus 200 receives the message data from the maintenance management apparatus 100 via the mobile communication network and stores the message data in the SMS storage unit 220 (S501). The communication relay apparatus 200 reads the received message data (S502) and determines whether the "SSH_START" message is contained (S503).

Upon determination that the "SSH_START" message is contained in the message data ("YES" in S503), the communication relay apparatus 200 actively performs a connection process from the communication relay apparatus 200 to the IP network via the mobile communication network.

Specifically, with connecting to the IP network via the mobile communication network, the communication control unit 210 acquires a dynamic global IP address assigned from the DHCP server. Using the acquired dynamic global IP address as the transmission source IP address, the communication control unit 210 transmits a Bridge connection request, whereby the IP address of the maintenance management apparatus 100 is designated as the transmission source IP address, to the maintenance management apparatus 100 via the IP network (S504).

The Bridge connection request transmitted from the communication relay apparatus 200 is received by the IP communication unit 140 of the maintenance management apparatus 100. The IP communication unit 140 stores the transmission source IP address contained in the Bridge connection request in the connection target storage unit 150, as the IP address of the communication relay apparatus 200. Also, the IP communication unit 140 designates a predetermined connection port (AcceptPort) for the Bridge connection request and stores the designated connection port in the connection target storage unit 150 (S303 and S304).

The IP communication unit 160 of the client-side transmits the IP address of the communication relay apparatus 200 to the user apparatus 300 (S305). The user apparatus 300 transmits an SSH connection request containing the received IP address of the communication relay apparatus 200 and the received connection port of the apparatus B to the maintenance management apparatus 100 (S102). The IP communication unit 140 uses the designated AcceptPort to receive the SSH connection request and uses the designated AcceptPort to relay SSH communication between the user apparatus 300 and the apparatus B.

The IP communication unit 140 waits until receiving the SSH connection request from the user apparatus 300 (S306). Upon reception of the SSH connection request (YES in S306), the IP communication unit 140 executes an SSH connection process for outputting the connection request for SSH connection containing the IP address of the communication relay apparatus 200 and the connection port of the apparatus B to the IP network over TCP/IP (S307).

After transmitting the Bridge connection request, the communication relay apparatus 200 waits until receiving the connection request for SSH connection from the maintenance management apparatus 100 (S505). Upon reception of the connection request (YES in S505), the communication control unit 210 performs TCP/IP connection (connect( )) for the connection port of the apparatus B of the remote control App unit 240 and establishes TCP/IP connection between the communication control unit 210 and the remote control App unit 240 (S506).

After establishing TCP/IP connection with the remote control App unit 240, the communication control unit 210 performs a relay connection request for relaying SSH communication with the user apparatus 300 via the maintenance management apparatus 100, to AcceptPort of the IP communication unit 140 (S507).

The IP communication unit 140 waits until receiving the relay connection request from the communication relay apparatus 200 (S308). Upon reception of the relay connection request (YES in S308), the communication unit 140 initiates a relay process for SSH communication between the user apparatus 300 and the communication relay apparatus 200 via AcceptPort (S309).

After the relay process is performed by the maintenance management apparatus 100 and the communication relay apparatus 200, the user apparatus 300 transmits an ID/password for login authentication for the apparatus B and a remote command for remote operation of the apparatus B, to the apparatus B (S103). The remote command received from the user apparatus 300 over TCP/IP is received by AcceptPort. The maintenance management apparatus 100 outputs the remote command to the IP network via AcceptPort so as to be destined for the communication relay apparatus 200. The communication relay apparatus 200 outputs the remote command received from the mobile communication network via the IP network to the remote control App unit 240 over TCP/IP.

As described above, according to this embodiment, in the example of FIG. 5, when the IP communication unit 140 receives the connection request for the apparatus B from the user apparatus 300, the dynamic global IP address notified from the communication relay apparatus 200 is used to transmit a relay request to the communication relay apparatus 200. The communication control unit 210 of the communication relay apparatus 200 connects to the apparatus B over of TCP/IP based on the relay request. After TCP/IP connection with the apparatus B, the communication control unit 210 transmits a relay connection request for relaying the remote command (information on remote operation) to the maintenance management apparatus 100. The IP communication unit 140 relays the remote command received from the user apparatus 300 to the communication relay apparatus 200 through a new communication route via AcceptPort according to the relay connection request.

After step S507 of FIG. 5, the communication control unit 210 can perform a process for determining whether the communication route has been disconnected according to the relay connection request. Upon determination that the communication route has been disconnected, the communication control unit 210 exercises control so that the session of the communication route is terminated and resources are released.

In step S504 of FIG. 4, the communication control unit 210 can use a timer to measure the time elapsed after reception of message data. Upon lapse of a predetermined period of time after receiving the message data, the communication control unit 210 can exercise control so as not to make a connection (Bridge connection request) from the communication relay apparatus 200 to the maintenance management apparatus 100.

For example, after reception of the message data, when a connection request is not transmitted from the maintenance management apparatus 100 based on the notified dynamic global IP address, the communication control unit 210 can perform a retry process for making a Bridge connection request again. In this case, the communication relay apparatus 200 is unable to understand the status of the maintenance management apparatus 100 in response to the Bridge connection request. Accordingly, the communication relay apparatus 200 transmits a packet for the Bridge connection request many times even though there is no connection request from the maintenance management apparatus 100. However, by setting an interval for performing a retry process for a Bridge connection request, upon lapse of a predetermined period of time after receiving message data, it is able to control so as not to transmit a packet for a Bridge connection request. Unnecessary packet transmission from the communication relay apparatus 200 to the maintenance management apparatus 100 can be thereby restrained.

Figure 6:
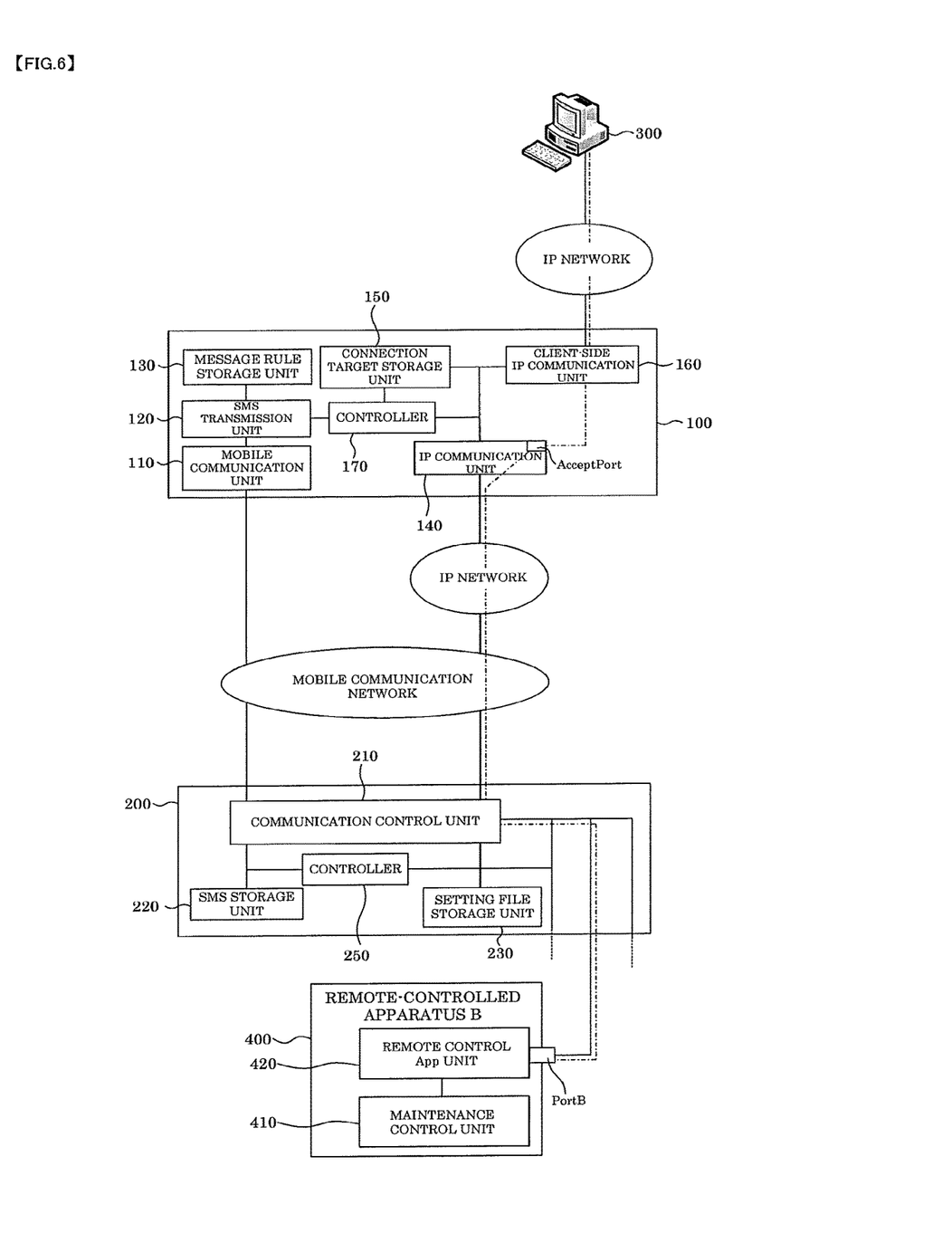
FIG. 6 is a configuration block diagram of a remote maintenance system according to a modified example 1.
Figure 7:
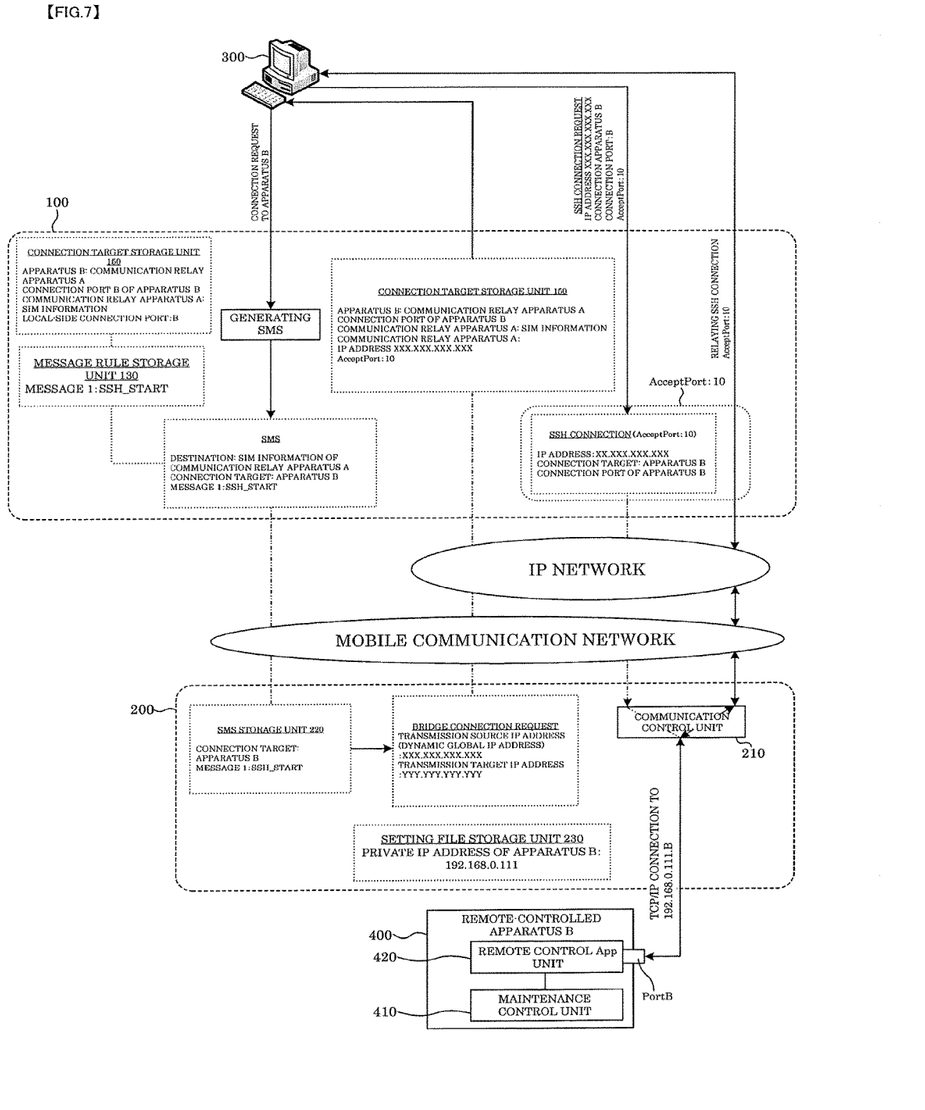
FIG. 7 is a diagram for explaining a connection method of connecting between a user apparatus and a remote-controlled apparatus according to the modified example 1.

FIG. 6 is a configuration block diagram of a remote maintenance system which is a modified example of this embodiment. FIG. 7 is a diagram explaining a connection method of connecting between the user apparatus 300 and the remote-controlled apparatus 400 according to the modified example of FIG. 6.

According to this modified example, the remote control App unit 240 of the communication relay apparatus 200 is provided to the remote-controlled apparatus 400. In the remote-controlled apparatus 400, a remote control App unit 420 is connected to a maintenance control unit 410. As in the case of the remote control App unit 240, a connection port is provided to the remote control App unit 420.

A private IP address for connection to the communication relay apparatus 200 is dynamically or statically (in a fixed manner) assigned to the remote-controlled apparatus 400. The connection target of the remote control App unit 420 can be specified as the private IP address+the port number. As illustrated in FIG. 7, for example, a connection to the remote control App unit 420 of the apparatus B can be specified as 192.168.0.111.B. The relationship between the apparatus B and the private IP address is stored in a setting file storage unit 230.

According to this modified example, in step S306 shown in FIG. 5, the maintenance management apparatus 100 receives an SSH connection request containing information indicating that the apparatus B is the connection target from the user apparatus 300. In step S307, the maintenance management apparatus 100 outputs a connection request for SSH connection containing the IP address of the communication relay apparatus 200, the information indicating that the apparatus B is the connection target and the connection port of the apparatus B to the IP network over TCP/IP.

In step S506 of FIG. 5, the communication control unit 210 according to this modified example specifies the private IP address+the port number as the TCP/IP connection target and performs TCP/IP connection (connect( )) with the connection port of the remote control App unit 420 of the apparatus B, and establishes TCP/IP connection between the communication control unit 210 and the remote control App unit 420. Upon establishment of TCP/IP connection with the remote control App unit 420, in step S507, the communication control unit 210 makes, to AcceptPort of the IP communication unit 140, a relay connection request for relaying SSH communication with the user apparatus 300 via the maintenance management apparatus 100. The other processes are as described above.

In the remote maintenance system according to this embodiment, the communication relay apparatus 200 assigned a dynamic global IP address uses SMS of the mobile communication network. Reception of message data of SMS by the communication relay device 200 triggers active connection from the communication relay apparatus 200 to the maintenance management apparatus 100. Thereafter, network connection and data communication from the user apparatus 300 to the remote-controlled apparatus 400 can be smoothly executed.

(Second Embodiment)

Figure 8:
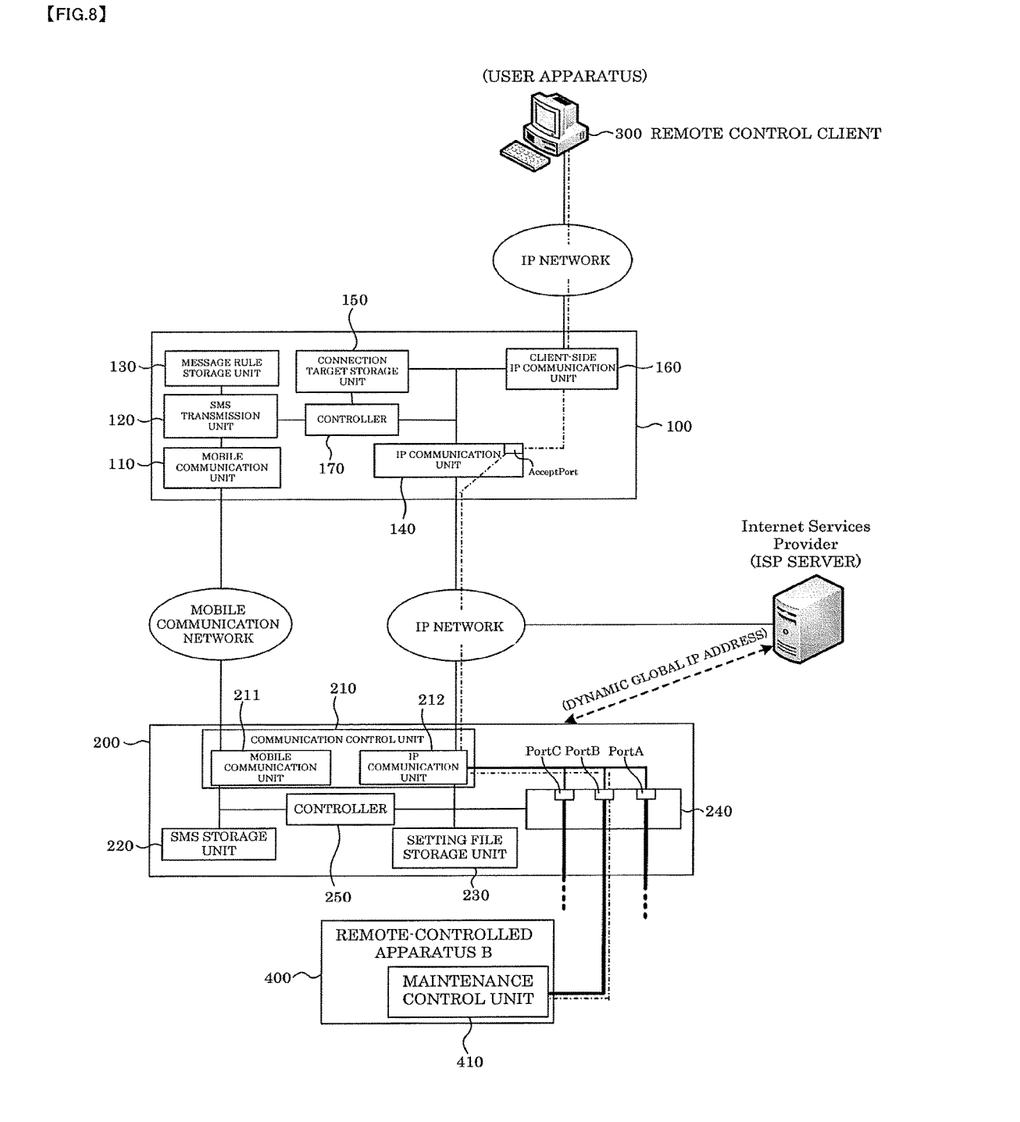
FIG. 8 is a configuration block diagram of a remote maintenance system according to a second embodiment.

FIG. 8 is a configuration block diagram of a remote maintenance system according to a second embodiment. According to the aforementioned first embodiment, the communication relay apparatus 200 does not have a function to directly connect to the IP network and cannot connect to the IP network without being routed through the mobile communication network. However, the communication relay apparatus 200 according to this embodiment is configured to directly connect to the IP network. The following description mainly refers to differences from the first embodiment. The reference numerals assigned to the elements in the first embodiment are also assigned to the same elements in this embodiment, and no description will be given for an overlapping element.

As illustrated in FIG. 8, the communication control unit 210 according to this embodiment includes a mobile communication unit 211 and an IP communication unit 212. The communication relay apparatus 200 according to this embodiment is configured to include a mobile communication function unit constituted by the mobile communication unit 211 and the SMS storage unit 220, and an IP network communication function unit constituted by the IP communication unit 212, the setting file storage unit 230, and the remote control App unit 240.

The mobile communication unit 211 performs communication control for receiving message data from the maintenance management apparatus 100 via the mobile communication network. In the message data, SIM information of the communication relay apparatus 200 is specified as a destination. The IP communication unit 212 controls TCP/IP connection and data communication with the maintenance management apparatus 100 via the IP network.

As described above, the communication relay apparatus 200 according to this embodiment can connect to the maintenance management apparatus 100 through each of the two separate networks. Different from the aforementioned first embodiment, it is possible to directly connect to the IP network without being routed through the mobile communication network.

As in the case of the aforementioned first embodiment, a global IP address is dynamically assigned from an ISP server of the IP network to the communication relay apparatus 200 according to this embodiment. As the global IP address dynamically changes, the maintenance management apparatus 100 is unable to identify the communication relay apparatus 200. According to this embodiment, the mechanism of which is identical to that of the aforementioned first embodiment, SMS via the mobile communication network is used in order to perform active connection from the remote location where located the remote-controlled apparatus 400 (the communication relay apparatus 200 to which a dynamic global IP address is assigned) to the IP network via the mobile communication network, and relays data communication and connection of SSH communication between the client and the remote machine.

In step S506 of the example of FIG. 5 according to the aforementioned first embodiment, the communication relay apparatus 200 receives a connection request for SSH connection (connect( ) directly from the maintenance management apparatus 100 via the IP network over TCP/IP, wherein the connection request for SSH connection includes the IP address of the communication relay apparatus 200 and the connection port of the apparatus B. According to the received TCP/IP connection (connect( )), the IP communication unit 212 establishes TCP/IP connection between the communication control unit 210 and the remote control App unit 240.

Upon establishment of TCP/IP connection with the remote control App unit 240, the IP communication unit 212 requests to AcceptPort of the IP communication unit 140 for a relay connection relaying SSH communication with the user apparatus 300 via the maintenance management apparatus 100 (S507).

The IP communication unit 140 of the maintenance management apparatus 100 waits until receiving a relay connection request from the communication relay apparatus 200 (S308). Upon reception of the relay connection request (YES in S308), a relay process for SSH communication via AcceptPort between the user apparatus 300 and the communication relay apparatus 200 is initiated (S309).

As in the case of the aforementioned first embodiment, the communication relay apparatus 200 assigned a dynamic global IP address also uses SMS of the mobile communication network according to this embodiment. Reception of message data of SMS by the communication relay apparatus 200 triggers active connection from the communication relay apparatus 200 to the maintenance management apparatus 100. Therefore, connection and data communication from the user apparatus 300 to the remote-controlled apparatus 400 can be executed.

In particular, the communication control unit 210 according to this embodiment is configured to include the mobile communication unit 211 and the IP communication unit 212. The communication control unit 210 can connect to the maintenance management apparatus 100 via each of two networks of the mobile communication network and the IP network. Accordingly, the communication relay apparatus 200 can directly connect to the IP network without being routed through the mobile communication network. Also, the communication relay apparatus 200 can establish TCP/IP connection between the communication control unit 210 and the remote control App unit 240 according to the TCP/IP connection (connect( )) received from the maintenance management apparatus 100 and smoothly perform TCP/IP connection between the user apparatus 300 and the remote-controlled apparatus 400.

Hereinabove, the remote maintenance system according to the embodiments has been described, but the IP address assigned to the communication relay apparatus 200 is not limited to the aforementioned global IP address. For example, the mobile communication network can dynamically assign, to the communication relay apparatus 200, a private IP address that belongs to a predetermined wireless relay apparatus. In this case, the mobile communication network can dynamically assign a global IP address to the wireless relay apparatus, and the wireless relay apparatus can dynamically assign a private IP address to the communication relay apparatus 200. Even in this case, the global IP address of the wireless relay apparatus for identifying the communication relay apparatus 200 is included. The global IP address and the private IP address are combined to constitute the IP address of the communication relay apparatus 200.

The aforementioned SSH is a protocol that uses encryption and authentication techniques for safe commination with a remote machine. For example, an operation window is called from a remote client, and a command (instruction) is manually input using a keyboard so as to be transmitted to and executed by the remoted machine. In turn, the result is received and displayed. The communication route is encrypted by combining public and secret key encryption. Transmission and reception are enabled by encrypting, for example, authentication information for login to the remote machine, the command input from the remote client, and the processing result output from the remote machine.

A mobile communication function of the communication relay apparatus 200 can be constituted by an individual mobile communication apparatus. For example, a mobile communication apparatus including the mobile communication unit 210 and the SMS storage unit 220 can be connected to the communication relay apparatus 200. In this case, the communication relay apparatus 200 with an IP network communication function can be configured to be able to refer to the SMS storage unit 220 of the mobile communication apparatus and receive, from the mobile commination apparatus, message data stored in the SMS storage unit 220.

Types of the user apparatus 300 includes mobile communication terminal apparatuses, such as multifunctional cellular phones and PDAs (Personal Digital Assistant); and information processing terminal apparatuses with communication and arithmetic operation functions, such as personal computers. The user apparatus 300 can have a browser function for displaying windows and information output from the maintenance management apparatus 100 and the remote-controlled apparatus 400.

In addition to the aforementioned hardware components, the maintenance management apparatus 100 can include: a CPU for controlling the entire device (each unit); a memory (main storage device); an operational input means, such as a mouse, keyboard, touch panel, or scanner; an output means, such as a printer or speaker; and an auxiliary storage device (hard disk, etc.).

Each of the functions of the present invention can be achieved by a program. A computer program prepared in advance for achieving each function is stored in an auxiliary storage device, and a control unit, such as a CPU, reads out, to the main storage device, the program stored in the auxiliary storage device. In turn, the control unit executes the program read out to the main storage device, so that the function of each unit of the present invention can be activated by the maintenance management apparatus 100 and the communication relay apparatus 200. On the other hand, each function of the present invention can be performed by separate control apparatuses. A plurality of control apparatuses can be connected directly or via the network to constitute the maintenance management apparatus 100.

The aforementioned program can be recorded in a computer-readable recording medium so as to be provided in a computer. Computer-readable recording media include: an optical disk, such as CD-ROM; a phase change type optical disk, such as DVD-ROM; a magnetic optical disk, such as an MO (Magnet Optical) or MD (Mini Disk); a magnetic disk, such as a floppy (registered trademark) disk or removable hard disk; and a memory card, such as a compact flash (registered trademark), smart media, SD memory card, or memory stick. Also, recording media include hardware devices, such as an integrated circuit (IC chip, etc.) specifically designed and configured for the purpose of the present invention.

Embodiments of the present invention are hereinabove described to demonstrate examples, but these embodiments are not intended to limit the scope of the invention. These novel embodiments can be carried out in various modes and can be omitted, replaced, or changed without departing from the purpose of the invention. The aforementioned embodiments and modifications thereof are within the scope of the invention and in line with the purpose of the invention as well as in the scope of the invention recited in the claims and equivalents thereof.

DESCRIPTION OF THE REFERENCE NUMERALS 100 maintenance management apparatus
110 mobile communication unit
120 SMS transmission unit
130 message rule storage unit
140 IP communication unit
150 connection target storage unit
160 client-side IP communication unit
170 controller
200 communication relay apparatus
210 communication control unit
220 SMS storage unit
230 setting file storage unit
240 remote control App unit
250 controller
300 user apparatus
400 remote-controlled apparatus
410 maintenance control unit

The invention claimed is:

1. A remote maintenance system, comprising:
a maintenance management apparatus configured to connect to a user apparatus; and
a communication relay apparatus that is a network node in the maintenance management apparatus and is configured to connect to a remote-controlled apparatus, and be assigned unique identification information of a mobile communication network in advance and an IP address dynamically assigned by a predetermined DHCP for identifying the communication relay apparatus as the network node,
wherein the maintenance management apparatus includes circuitry configured to:
transmit message data including the unique identification information of the communication relay apparatus as a destination, to the communication relay apparatus via the mobile communication network; and
receive the IP address from the communication relay apparatus and to relay to the communication relay apparatus remote control information received from the user apparatus, based on the received IP address, and
wherein the communication relay apparatus includes circuitry configured to:
receive the message data via the mobile communication network; and
connect to the maintenance management apparatus relative to a reception of the message data and to notify the IP address dynamically assigned to the communication relay apparatus, and to receive the remote control information including the IP address as a destination from the maintenance management apparatus and to relay the remote control information to the remote-controlled apparatus.

2. The remote maintenance system according to claim 1, wherein a communication of the remote control information from the user apparatus to the remote-controlled apparatus is performed by a TCP/IP communication protocol using an SSH tunnel,
wherein the maintenance management apparatus includes circuitry configured to receive the remote control information from the user apparatus via an IP network by the TCP/IP communication protocol and to relay the received remote control information to the communication relay apparatus, and
wherein the communication relay apparatus includes circuitry configured to relay the remote control information received from the maintenance management apparatus to the remote-controlled apparatus by the TCP/IP communication protocol.

3. The remote maintenance system according to claim 1, wherein the maintenance management apparatus includes circuitry configured to transmit a relay request to the communication relay apparatus using the IP address when a connection request for the remote-controlled apparatus is received from the user apparatus,
wherein the communication relay apparatus includes circuitry configured to connect to the remote-controlled apparatus based on the relay request and transmit to the maintenance management apparatus a relay connection request for relaying after connecting to the remote-controlled apparatus the remote control information, and
wherein the maintenance management apparatus includes circuitry configured to relay to the communication relay apparatus the remote control information received from the user apparatus through a communication route based on the relay connection request.

4. The remote maintenance system according to claim 3, wherein the communication relay apparatus includes circuitry configured to determine whether the communication route based on the relay connection request has been disconnected, and terminate a session of the communication route if the communication route has been disconnected.

5. The remote maintenance system according to claim 1, wherein the communication relay apparatus includes circuitry configured to control to be not performed a connecting from the communication relay apparatus to the maintenance management apparatus if a predetermined time has passed after receiving the message data.

6. The remote maintenance system according to claim 1, wherein the communication relay apparatus is connectable only to the mobile communication network that is mutually connected with an IP network, and the communication relay apparatus is connected to the maintenance management apparatus via the IP network, through the mobile communication network.

7. A network connection method of connecting between a maintenance management apparatus configured to connect to a user apparatus and a communication relay apparatus that is a network node in the maintenance management apparatus and configured to connect to a remote-controlled apparatus remotely controlled from the user apparatus,
the communication relay apparatus configured to be assigned unique identification information of a mobile communication network in advance and an IP address dynamically assigned by a predetermined DHCP for identifying the communication relay apparatus as the network node, the network connection method comprising the steps of:
- transmitting message data including the unique identification information of the communication relay apparatus as a destination, to the communication relay apparatus via the mobile communication network, by the maintenance management apparatus;
- receiving the message data via the mobile communication network, by the communication relay apparatus;
- notifying the IP address dynamically assigned to the communication relay apparatus to the maintenance management apparatus relative to a reception of the message data, by the communication relay apparatus;
- receiving the IP address from the communication relay apparatus and relaying to the communication relay apparatus a remote control information received from the user apparatus based on the received IP address, by the maintenance management apparatus; and
- receiving the remote control information including the IP address as a destination from the maintenance management apparatus and relaying the remote control information to the remote-controlled apparatus, by the communication relay apparatus.

8. A communication relay apparatus, comprising:
circuitry configured to:
- connect to a remote-controlled apparatus remotely controlled by a user apparatus and to mediate network connection and communication between the user apparatus and the remote-controlled apparatus, and be assigned unique identification information of a mobile communication network in advance and an IP address dynamically assigned by a predetermined DHCP for identifying the communication relay apparatus as a network node of a maintenance management apparatus connected to the user apparatus;
- receive message data transmitted from maintenance management apparatus via the mobile communication network, the message data including the unique identification information of the communication relay apparatus as a destination; and
- notify the IP address dynamically assigned to the communication relay apparatus to the maintenance management apparatus relative to a reception of the message data, receive the remote control information including the IP address as a destination from the maintenance management apparatus, the remote control information is received from the user apparatus, and relay the remote control information to the remote-controlled apparatus.

9. A maintenance management apparatus, comprising:
circuitry configured to:
- connect to a user apparatus and a communication relay apparatus of a remote-controlled apparatus remotely controlled by the user apparatus, and mediate network connection and communication between the user apparatus and the remote-controlled apparatus via the communication relay apparatus,
- generate message data including a unique identification information of a mobile communication network, be assigned to the communication relay apparatus in advance, and transmit the message data to the communication relay apparatus via the mobile communication network; and
- receive an IP address dynamically assigned by a predetermined DHCP for identifying the communication relay apparatus, the IP address being notified from the communication relay apparatus relative to a reception of the message data, and relay a remote control information received from the user apparatus to the communication relay apparatus based on the received IP address.

* * * * *